United States Patent
Li et al.

(10) Patent No.: US 11,326,805 B2
(45) Date of Patent: May 10, 2022

(54) CONTROL METHOD FOR AIR CONDITIONING SYSTEM

(71) Applicant: Carrier Corporation, Palm Beach Gardens, FL (US)

(72) Inventors: Sheng Li, Shanghai (CN); Xinyu Wu, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 114 days.

(21) Appl. No.: 16/813,184

(22) Filed: Mar. 9, 2020

(65) Prior Publication Data

US 2020/0292200 A1    Sep. 17, 2020

(30) Foreign Application Priority Data

Mar. 15, 2019    (CN) .......................... 201910198195.8

(51) Int. Cl.
*F24F 11/86*    (2018.01)
*F24F 11/63*    (2018.01)
(Continued)

(52) U.S. Cl.
CPC .............. *F24F 11/86* (2018.01); *F24F 11/63* (2018.01); *F24F 11/74* (2018.01);
(Continued)

(58) Field of Classification Search
CPC .. F24F 11/86; F24F 11/63; F24F 11/74; F24F 2140/50; F24F 2140/10; F24F 2140/20
See application file for complete search history.

(56) References Cited

U.S. PATENT DOCUMENTS 4,338,791 A * 7/1982 Stamp, Jr. ............... F25B 49/02
                                                    165/242
5,440,891 A * 8/1995 Hindmon, Jr. ........ F25B 49/022
                                                    62/117
(Continued)

FOREIGN PATENT DOCUMENTS

CN       1745282 A     3/2006
CN     101389908 A     3/2009
(Continued)

OTHER PUBLICATIONS

Ben-Nakhi, et al., "Cooling load prediction for buildings using general regression neural networks", Envery Conversion and Management, 2004, 16 pages.

(Continued)

*Primary Examiner* — Nelson J Nieves
(74) *Attorney, Agent, or Firm* — Cantor Colburn LLP

(57) ABSTRACT

A control method for an air conditioning system. The control method includes: S100, acquiring an actual cooling/heating capacity output by the air conditioning system, and acquiring an actual temperature change rate of an indoor heat exchange unit; S200, automatically learning a heat exchange load characteristic curve of the indoor heat exchange unit based on the actual cooling/heating capacity and the temperature change rate; S300, acquiring a steady state load and/or a desired load of the indoor heat exchange unit based on the heat exchange load characteristic curve; and S400 adjusting the number of operating compressors and rotational speeds of compressors, and/or adjusting the number of operating injectors and opening degrees of injectors, based on the steady state load and/or the desired load.

12 Claims, 1 Drawing Sheet

(51) Int. Cl.
*F24F 11/74* (2018.01)
*F24F 140/50* (2018.01)
*F24F 140/10* (2018.01)
*F24F 140/20* (2018.01)

(52) U.S. Cl.
CPC ....... *F24F 2140/10* (2018.01); *F24F 2140/20* (2018.01); *F24F 2140/50* (2018.01)

(56) References Cited

U.S. PATENT DOCUMENTS

| | | |
|---|---|---|
| 5,586,444 A | 12/1996 | Fung |
| 6,332,327 B1 | 12/2001 | Street et al. |
| 6,577,962 B1 | 6/2003 | Afshari |
| 7,206,670 B2 | 4/2007 | Pimputkar et al. |
| 7,225,171 B2 | 5/2007 | Kikuchi et al. |
| 7,305,282 B2 | 12/2007 | Chen |
| 7,451,017 B2 | 11/2008 | McNally |
| 7,489,990 B2 | 2/2009 | Fehr et al. |
| 7,757,505 B2 | 7/2010 | Sunderland |
| 7,814,758 B2 | 10/2010 | Landers et al. |
| 7,873,442 B2 | 1/2011 | Tsui |
| 7,905,103 B2 | 3/2011 | Larsen et al. |
| 7,991,512 B2 | 8/2011 | Chandra et al. |
| 8,065,098 B2 | 11/2011 | Gautam |
| 8,392,031 B2 | 3/2013 | Krok et al. |
| 8,406,935 B2 | 3/2013 | Ko et al. |
| 8,543,248 B2 | 9/2013 | Iino et al. |
| 8,600,571 B2 | 12/2013 | Dillon et al. |
| 8,653,968 B2 | 2/2014 | Brown et al. |
| 8,705,359 B2 | 4/2014 | Bou-Abboud |
| 8,706,309 B2 | 4/2014 | Schweitzer, III et al. |
| 8,880,226 B2 | 11/2014 | Raman et al. |
| 9,002,531 B2 | 4/2015 | Mansfield |
| 9,261,863 B2 | 2/2016 | Sloop et al. |
| 9,261,864 B2 | 2/2016 | Dzafic |
| 9,335,747 B2 | 5/2016 | Steven et al. |
| 9,535,474 B2 | 1/2017 | Kubota et al. |
| 9,564,757 B2 | 2/2017 | Wang et al. |
| 9,576,327 B2 | 2/2017 | Ghosh et al. |
| 9,639,904 B2 | 5/2017 | Idrees et al. |
| 9,810,442 B2 | 11/2017 | Matsuoka et al. |
| 10,175,681 B2 | 1/2019 | Wenzel et al. |
| 2007/0227161 A1 | 10/2007 | Boer et al. |
| 2012/0210736 A1* | 8/2012 | Rockenfeller .......... F25B 49/02 62/115 |
| 2015/0295402 A1 | 10/2015 | Black et al. |
| 2016/0042377 A1 | 2/2016 | Ilic et al. |
| 2016/0109147 A1* | 4/2016 | Uno .......................... F24F 11/62 700/276 |
| 2016/0124451 A1 | 5/2016 | Yoshitani |
| 2016/0252266 A1* | 9/2016 | Ushirosako ............ G05B 15/02 700/278 |
| 2017/0003150 A1 | 1/2017 | Noboa et al. |
| 2017/0336119 A1 | 11/2017 | McDonough et al. |
| 2018/0073790 A1 | 3/2018 | Wallace et al. |
| 2019/0309970 A1* | 10/2019 | Park ..................... F24F 11/0008 |
| 2021/0041121 A1* | 2/2021 | Park ........................ G06N 99/00 |
| 2021/0123622 A1* | 4/2021 | Notaro .................... F24F 11/62 |

FOREIGN PATENT DOCUMENTS

| | | | |
|---|---|---|---|
| CN | 101995072 A | | 3/2011 |
| CN | 102969720 A | | 3/2013 |
| CN | 104807143 A | | 7/2015 |
| CN | 103003643 B | | 12/2015 |
| CN | 106016534 A | * | 10/2016 |
| CN | 106051969 A | * | 10/2016 |
| CN | 106786551 A | | 5/2017 |
| CN | 106786622 A | | 5/2017 |
| CN | 106907828 A | * | 6/2017 |
| CN | 107093902 A | | 8/2017 |
| CN | 107482638 A | | 12/2017 |
| CN | 107940693 A | | 4/2018 |
| CN | 108981219 A | * | 12/2018 |
| EP | 1342961 A1 | | 9/2003 |
| JP | S57129360 A | | 8/1982 |
| JP | H0634188 A | | 2/1994 |
| WO | WO-2006095571 A1 | * | 9/2006 ............. F25D 29/00 |
| WO | WO-2015079506 A1 | * | 6/2015 ............. F24F 11/30 |
| WO | 2018080446 A1 | | 5/2018 |

OTHER PUBLICATIONS

Ge, Y T, et al., "Mathematical modelling of supermarket refrigeration systems for design, energy prediction and control", Mathematical modelling of supermarket refrigeration systems, 2000, pp. 101-113.

Yao, Ye, et al., "Hourly cooling load prediction by a combined forecasting model based on Analytic Hierarchy Process", International Journal of Thermal Sciences, 2004, 12 pages.

Carrillo, J.A. Exposito et al., "Thermodynamic Comparison of Ejector Cooling Cycle. Ejector Characterisation by Means o Entrainment Ratio and Compression Efficiency", International Journal of Refrigeration, Elsevier, Amsterdam, NL, vol. 74, Nov. 18, 2016, pp. 371-384.

European Search Report for Application No. 20163103.3; dated Jul. 29, 2020; 8 Pages.

* cited by examiner

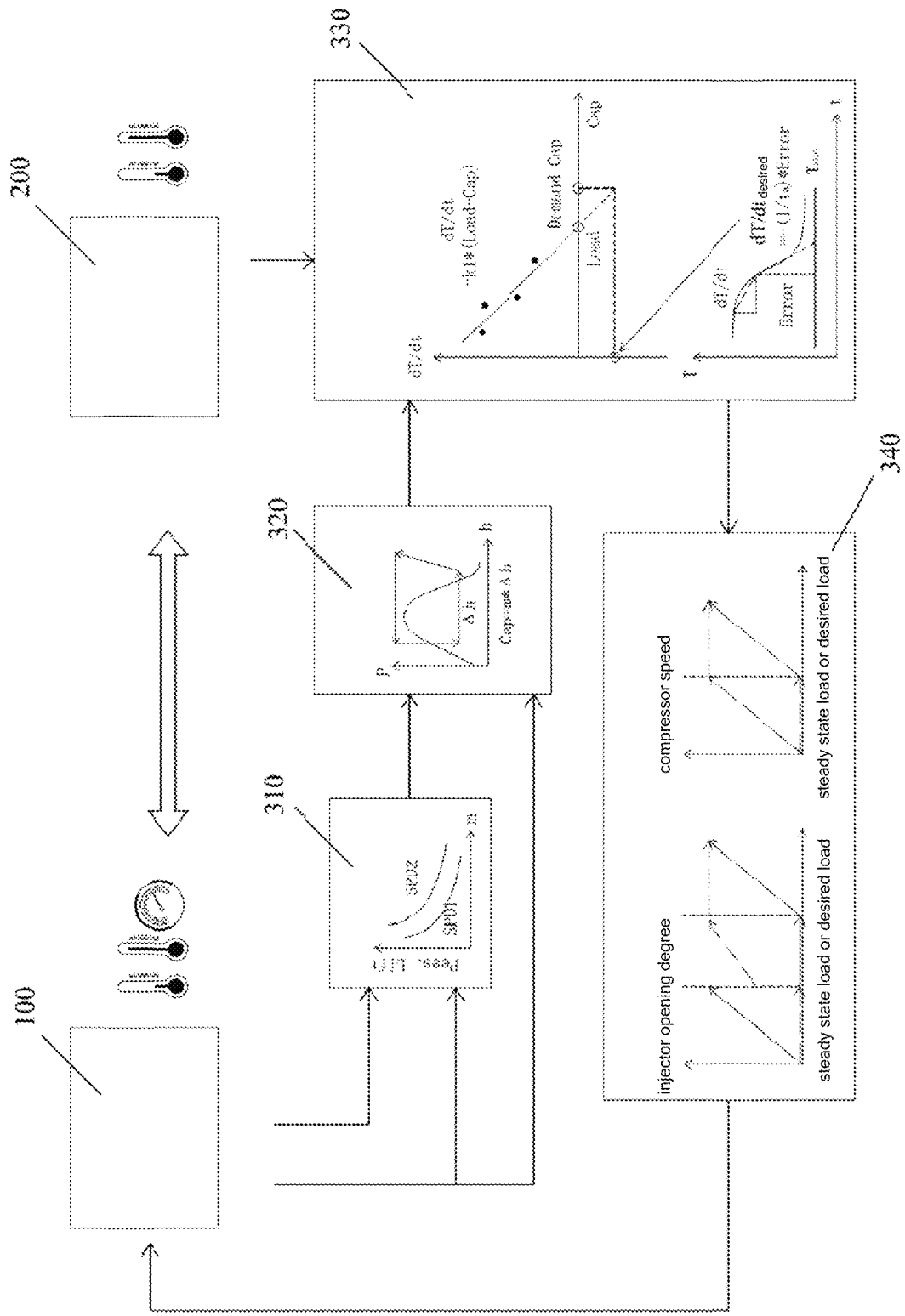

CONTROL METHOD FOR AIR CONDITIONING SYSTEM

FOREIGN PRIORITY

This application claims priority to Chinese Patent Application No. 201910198195.8, filed Mar. 15, 2019, and all the benefits accruing therefrom under 35 U.S.C. § 119, the contents of which in its entirety are herein incorporated by reference.

FIELD OF THE INVENTION

The present disclosure relates to the field of heat exchange, and in particular to an air conditioning system and a control method for the air conditioning system.

BACKGROUND OF THE INVENTION

Currently, multiple sets of parallel components are typically used in large air conditioning systems in commercial applications for better partial-load regulation ability and better operating efficiency. For example, they may be embodied as a plurality of parallel heat exchange units at the end of indoor air, etc.; or they may also be embodied as a plurality of parallel compressors and/or a plurality of parallel injectors at an outdoor cooling/heating end. In this case, under some working conditions, for example, in a case where only part of the indoor heat exchange units are opened according to actual requirements, the outdoor cooling/heating end of the air conditioning system is not required to operate under full load, and only part of the compressors or injectors are required to operate to meet the load and achieve maximum efficiency. However, how to specifically determine the supply and demand relationship between these parallel components, and how to specifically coordinate these parallel components to achieve stable on-demand cooling/heating and improved energy efficiency are problems that need to be addressed.

SUMMARY OF THE INVENTION

In view of this, the present disclosure provides an air conditioning system and a control method for the air conditioning system, thereby effectively solving or at least alleviating one or more of the above problems in the prior art and problems in other aspects.

In order to achieve at least one object of the present disclosure, according to a first aspect of the present disclosure, a control method for an air conditioning system is provided, the air conditioning system including a compressor and/or an injector, and the control method including: S100, acquiring an actual cooling/heating capacity output by the air conditioning system, and acquiring an actual temperature change rate of an indoor heat exchange unit; S200, automatically learning a heat exchange load characteristic curve of the indoor heat exchange unit based on the actual cooling/heating capacity and the temperature change rate; S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and S400, adjusting the number of operating compressors and rotational speeds of compressors, and/or adjusting the number of operating injectors and opening degrees of injectors, based on the steady state load and/or the desired load.

Optionally, the desired temperature change rate is acquired based on an actual temperature of the indoor heat exchange unit, a desired temperature set by a customer, and a desired adjustment time set by the customer.

Optionally, a function of the desired temperature change rate is $dT/dt_{desired} = -(1/t_0)*Error$; where $dT/dt_{desired}$ is the desired temperature change rate, $t_0$ is the desired adjustment time, and Error is a difference between the actual temperature and the desired temperature.

Optionally, a function of the heat exchange load characteristic curve is $dT/dt = k_1*(Load-Cap)$; where $dT/dt$ is the actual temperature change rate, Cap is the actual cooling/heating capacity, $k_1$ is a slope of fitted heat exchange load characteristic curve, and Load is fitted steady state load.

Optionally, the actual cooling/heating capacity output by the air conditioning system is acquired based at least on an actual flow rate output by the compressor, a temperature and/or pressure of a refrigerant delivered to the indoor heat exchange unit, and a temperature and/or pressure of the refrigerant returned from the indoor heat exchange unit.

Optionally, in an air conditioning system having injectors, the actual cooling/heating capacity output by the air conditioning system is also correlated to a ratio of mass entrainments of the injectors.

Optionally, the actual flow rate output by the compressor is acquired based on a rotational speed of the compressor, inlet pressure and/or inlet temperature, and outlet pressure and/or outlet temperature.

Optionally, the actual flow rate output by the compressor is acquired based on a flow meter.

Optionally, the actual flow rate output by the compressor is acquired based on opening degrees of throttling elements at individual indoor heat exchange units and differences between their upstream and downstream pressures.

Optionally, the number of operating compressors is adjusted to the minimum when the steady state load and/or the desired load are satisfied.

Optionally, when all of the compressors are variable frequency compressors, the rotational speeds of all operating compressors are adjusted to be the same if the steady state load and/or the desired load are satisfied.

Optionally, when all of the compressors are fixed frequency compressors, the steady state load and/or the desired load are satisfied by automatically turning on/turning off a minimum number of operating fixed frequency compressors.

Optionally, the number of operating injectors is adjusted to the minimum when the steady state load and/or the desired load are satisfied.

Optionally, the method of acquiring the heat exchange load characteristic curve through automatically learning as described in S200 includes one or more of function fitting, constructing an artificial neural network and constructing a support vector machine model.

According to another aspect of the present disclosure, an air conditioning system is further provided, which includes: a controller configured to perform the control method as described above.

Optionally, the air conditioning system is a refrigeration system or a heat pump system.

Optionally, the air conditioning system further includes: an injector disposed in a refrigerant circuit of the air conditioning system.

According to the air conditioning system and the control method for the air conditioning system of the present disclosure, the steady load and/or the desired load are acquired by automatically learning a heat exchange load characteristic curve, and based on this, the number of operating compressors and rotational speeds of compressors are adjusted, and/or the number of operating injectors and opening degrees of injectors are adjusted. In this way, it is ensured that the air conditioning system can stably output a cooling/heating capacity to meet the load requirements of the indoor heat exchange units, guaranteeing a stable, coordinated and efficient operation of the system.

BRIEF DESCRIPTION OF THE DRAWINGS

The technical solutions of the present disclosure will be further described in detail below with reference to the accompanying drawings and embodiments, but it should be understood that the drawings are only provided for the purpose of explanation, and should not be considered as limiting the scope of the present disclosure. In addition, unless otherwise specified, the drawings are only intended to conceptually illustrate the structures and constructions described herein, and are not necessarily drawn to scale.

FIG. 1 is a schematic control diagram of an air conditioning system according to the present disclosure.

DETAILED DESCRIPTION OF THE EMBODIMENT(S) OF THE INVENTION

The present disclosure will be described in detail below with reference to the exemplary embodiments in the drawings. However, it should be understood that the present disclosure may be embodied in a variety of different forms and should not be construed as being limited to the embodiments set forth herein. The embodiments are provided to make the disclosure of the present disclosure more complete and thorough, and to fully convey the concept of the present disclosure to those skilled in the art.

It should also be understood by those skilled in the art that the air conditioning system proposed by the present disclosure does not narrowly refer to an air conditioner in the industry which is used in a building and equipped with an outdoor cooling/heating unit and an indoor heat exchange unit. Rather, it should be considered as a kind of thermodynamic system with air conditioning function, which is driven by various types of power sources (for example, electric power) to exchange heat with the air at a position to be adjusted, by means of a phase change of the refrigerant in the system. For example, when the air conditioning system is used in a Heating Ventilating & Air Conditioning (HVAC) system in a building, it may be a refrigeration system with a cooling-only function (only cooling) or a heat pump system with both cooling and heating functions. As another example, when the air conditioning system is used in the field of cold chain, it may be a transport refrigeration system or a refrigeration/freezing system.

In particular, a control method for an air conditioning system is provided herein. The control method includes at least the following steps.

First, S100 is executed to acquire an actual cooling/heating capacity output by the air conditioning system, and to acquire an actual temperature change rate of an indoor heat exchange unit. This step is intended to acquire the operational data required for capacity evaluation or prediction for subsequent evaluation or prediction work. It should be noted that the operational data can be acquired in a direct way or in an indirect way. Various factors such as acquisition cost, acquisition accuracy, and application scenes may be taken into consideration for the selection of specific manner Several parameter acquisition ways are provided exemplarily herein for reference.

For example, the actual cooling/heating capacity output by the air conditioning system may be acquired based at least on an actual flow rate output by the compressor, a temperature and/or pressure of a refrigerant delivered to the indoor heat exchange unit, and a temperature and/or pressure of the refrigerant returned from the indoor heat exchange unit. Of course, in an air conditioning system having injectors (also referred to as ejectors), since the refrigerant fluid output by the compressor generates an entrainment action through high-pressure nozzles of the injectors to suction the fluid from the outlet of the indoor heat exchange unit, the concept of a ratio of mass entrainments of the injectors in the art should also be introduced. At this point, the actual cooling/heating capacity output by the air conditioning system is also correlated to the ratio of mass entrainments of the injectors. The ratio of mass entrainments of the injectors can be acquired from an injector high pressure, and pressures and/or temperatures at an air inlet and an outlet.

For the parameters required to acquire the actual cooling/heating capacity output by the air conditioning system, some of them can be directly acquired by existing sensors with mature technologies and suitable cost, such as pressure sensor, temperature sensor, speed sensor and the like. For the actual flow rate output by the compressor, on one hand, it is indeed possible to directly use a flow meter to acquire the value, but the current high-precision flow meter involves a high cost. Therefore, it is also conceivable to use a combination of indirect measurement with calculation to acquire the flow rate. For example, the actual flow rate output by the compressor can be acquired based on the rotational speed of the compressor, inlet pressure and/or temperature, and outlet pressure and/or temperature. For a conventional air conditioning system, there are typically corresponding sensors for measuring these parameters. Therefore, such a flow rate acquisition method does not add extra cost, and has high precision. In addition, since the parameters to be measured are on the host side, it is more feasible to acquire the parameters. Alternatively, the actual flow rate output by the compressor can also be acquired based on opening degrees of throttling elements at individual indoor heat exchange units and differences between their upstream and downstream pressures, which is also applicable to some situations.

Then, S200 is executed to automatically learn a heat exchange load characteristic curve of the indoor heat exchange unit based on the actual cooling/heating capacity and the temperature change rate. This step is intended to acquire reference parameters required for capacity evaluation or prediction for performing subsequent evaluation or prediction work. The automatic learning process can include one or more of function fitting, constructing an artificial neural network and constructing a support vector machine model. In some embodiments, a curve fitting method can be employed to automatically learn the heat exchange load characteristic curve of the indoor heat exchange unit. In this embodiment, the actual cooling/heating capacities output by the system at a plurality of time points and the temperature change rates at the time points are acquired and reflected in a coordinate interval, and thereby a linear function associated with a plurality of points is acquired by fitting. In this embodiment, the function of the heat exchange load characteristic curve is $dT/dt = k_1 *(Load - Cap)$; where $dT/dt$ is the actual temperature change rate, Cap is the actual cooling/heating capacity, $k_1$ is a slope of fitted heat exchange load characteristic curve, and Load is fitted steady state load.

After acquiring the heat exchange load characteristic curve, S300 can be executed for application. That is, the steady state load or the desired load of the indoor heat exchange unit is acquired based on the heat exchange load characteristic curve. The steady state load is the actual cooling/heating capacity corresponding to the point where the temperature change rate on the heat exchange load characteristic curve is 0. That is, according to the current system output, when this time point is reached, the temperature change at the indoor heat exchange unit in the system tends to be stable, and the point value reflected on the heat exchange load characteristic curve is the actual cooling/heating capacity of the system. The desired load is the actual cooling/heating capacity corresponding to the point where the temperature change rate on the heat exchange load characteristic curve is a desired temperature change rate. The steady state load of the system and the desired load of the system based on the user's desired temperature change rate are not the same. For example, when the indoor air temperature change tends to be stable, it may be 1° C. away from the user's preset desired temperature, that is, the actual cooling/heating capacity of the system is insufficient to meet the actual needs of the user at this point, and the system output needs to be increased to eliminate this 1° C. temperature deviation. At this point, a desired load greater than the steady state load is required to drive the current temperature to dynamically approach the desired temperature to eliminate the temperature deviation. Conversely, a desired load less than the steady state load may also be required to eliminate the temperature deviation. This step is intended to dynamically know about the current state of the system and evaluate whether it is necessary to increase or decrease the system's output capacity so that it becomes closer to the preset target value.

When the desired load is acquired, the desired temperature change rate is related to an actual temperature of the indoor heat exchange unit, a desired temperature set by the customer, and a desired adjustment time set by the customer. For example, if the desired temperature differs greatly from the actual temperature, and/or the desired adjustment time set by the customer is shorter, there is a larger desired temperature change rate, and correspondingly a larger actual cooling/heating capacity is required to be output. Conversely, if the desired temperature differs from the actual temperature by a small amount, and/or the desired adjustment time set by the customer is longer, there is a smaller desired temperature change rate, and correspondingly only a smaller actual cooling/heating capacity is required to be output. More specifically, a function of the desired temperature change rate is $dT/dt_{desired} = -(1/t_0)*Error$; where $dT/dt_{desired}$ is the desired temperature change rate, $t_0$ is the desired adjustment time, and Error is a difference between the actual temperature and the desired temperature.

After acquiring the evaluation of the system based on the foregoing steps, S400 may be executed according to the above result, and the number of operating compressors and rotational speeds of compressors, and/or the number of operating injectors and opening degrees of injectors are adjusted, based on the steady state load and/or the desired load. Of course, the adjustment of the compressor applies to any air conditioning system; the corresponding adjustment of the injector only applies to an air conditioning system having this component, which is typically a large differential pressure system, such as a supercritical system or a partial subcritical system.

According to the control method for an air conditioning system in the foregoing embodiment, the steady load and/or the desired load are acquired by automatically learning a heat exchange load characteristic curve, and based on this, the number of operating compressors and rotational speeds of compressors are adjusted, and/or the number of operating injectors and opening degrees of injectors are adjusted. In this way, it is ensured that the air conditioning system can stably output a cooling/heating capacity to meet the load requirements of the indoor heat exchange units, guaranteeing a stable, coordinated and efficient operation of the system.

Although on-demand coordination of compressors or injectors is mentioned in step S400 of the present disclosure, it is still highly likely that there are multiple ways of coordination in a case that the steady state load and/or the desired load are satisfied. In this situation, the following modifications can be further made to optimize the step.

In one example, the number of operating compressors is adjusted to the minimum when the steady state load and/or the desired load are satisfied. For example, there are three parallel compressors with rated output capacities of 50 kW, 30 kW and 20 kW, respectively. In this case, if the required steady-state load or the desired load is 50 kW, there are a plurality of schemes of turning on the compressors that can satisfy the requirement, e.g., the 50 kW compressor turning on alone; or the 30 kW and the 20 kW compressors turning on at the same time. In this case, the higher priority of turning on the compressors is the former, since when fewer compressors are turned on, the corresponding control is simpler and the operation is more reliable.

In another example, when all of the compressors are variable frequency compressors, the rotational speeds of all operating compressors are adjusted to be the same if the steady state load and/or the desired load are satisfied. For example, there are three parallel variable frequency compressors each with a rated output capacity of 20 kW. In this case, if the required steady-state load or the desired load is 30 kW, there are a plurality of schemes of turning on the compressors that can satisfy the requirement, e.g., turning on two 20 kW compressors with one compressor outputting 20 kW, and the other one outputting 10 kW, or turning on two compressors at the same time, each outputting 15 kW. In this case, the higher priority of turning on the compressors is the latter, which makes it easier to control the compressor.

In yet another example, when all of the compressors are fixed frequency compressors, the steady state load and/or the desired load are satisfied by automatically turning on/closing a minimum number of operating fixed frequency compressors. For example, there are four parallel compressors with rated output capacities of 50 kW, 40 kW, 30 kW, and 20 kW, respectively. In this case, if the required steady state load or the desired load is 90 kW, there are a plurality of schemes of turning on the compressors that can satisfy the requirement, e.g., turning on the 50 kW and 40 kW compressors at the same time; or turning on the 50 kW, 30 kW, and 20 kW compressors at the same time (if the desired load cannot be exactly satisfied, using a compressor turning on scheme with a rated output capacity slightly larger than the desired load is considered); or turning on the 40 kW, 30 kW and 20 kW compressors at the same time. In this case, the higher priority of turning on the compressors is the first mode, since when fewer compressors are turned on, the corresponding control is simpler and the operation is more reliable.

Since the fixed frequency compressor cannot be stabilized at a set value by frequency modulation after the temperature cooling capacity reaches the set value, the automatic turning on/turning off is used to control it within a specific range around the set value. For example, there are three parallel fixed frequency compressors each with an output capacity of 30 kW. In this case, if the required steady state load or the desired load is 80 kW, it is required to turn on all the three compressors. However, since these compressors cannot be frequency-modulated, they will provide a cooling capacity 90 kW of when all of them are turned on. The surplus 10 kW will cause the temperature of the indoor heat exchange unit to continuously drop and approach the set value, and eventually fall below the set value. During this process, the temperature change rate continues to increase, and the desired load acquired by the corresponding calculation is continuously reduced. When it is reduced to 60 kW, one of the fixed frequency compressors that have been turned on can be automatically turned off, and the other two fixed frequency compressors keep being turned on.

Alternatively, for systems with injectors, it is also possible to adjust the number of operating injectors to the minimum when the steady state load and/or the desired load are satisfied.

It is also to be understood that while the foregoing specific embodiments may have shown, disclosed, or claimed a particular order of the steps, it is noted that certain steps may be carried out in any order, be separated or be combined, unless the particular order of executing the steps has been expressly specified.

Furthermore, an embodiment of an air conditioning system is further provided herein. It can be either a refrigeration system or a heat pump system. Moreover, the outdoor cooling/heating unit 100 and the indoor heat exchange unit 200 as well as the specific condensing component, the evaporating component, the throttling components, the compressors, and the like contained therein may be conventional mature components. Moreover, the controller thereof should be capable of being configured to perform the control method according to any of the foregoing embodiments or combinations thereof. That is, the controller may have at least some of the functional entities such as a flow rate evaluation module 310 configured to calculate and estimate a flow rate, a capacity evaluation module 320 configured to calculate and estimate an actual output capacity, a load evaluation and prediction module 330 configured to calculate and estimate an actual output load and a desired output load, and a coordination control module 340 configured to coordinatingly control the compressors or injectors based on the evaluation results. Of course, it should be understood by those skilled in the art that the contents related to the adjustment of injector described in the aforementioned control method are effective only when the air conditioning system is provided with the injector. In addition, the controller should also be associated with a pressure sensor, a temperature sensor or a speed sensor at a specific position in the system to acquire the parameters required to perform the calculation and estimation process.

The system coordination process of the air conditioning system in operation according to one embodiment of the present disclosure will be described further in connection with FIG. 1 as follows. First, based on information such as compressor inlet pressure and/or temperature, outlet pressure and/or temperature, and compressor rotational speed and the like from the sensors, the flow rate evaluation module 310 of the controller of the air conditioning system acquires a mass flow of the refrigerant output from the compressor at this point. In the illustrated acquisition mode, for a specific model of the compressor, the speed curves SPD1, SPD2, etc. can be determined at the factory, and based on the difference Pres.Lift between the inlet and outlet pressures of the compressor from the sensor, the mass flow m of the refrigerant output from the compressor can be acquired. Subsequently, the capacity evaluation module 320 of the controller acquires the inlet and outlet enthalpy difference $\Delta h$ of the indoor heat exchange unit based on the temperature and/or pressure of refrigerant delivered to the indoor heat exchange unit from the sensors, and on the temperature and/or pressure of refrigerant returned from the indoor heat exchange unit from the sensors, and then in combination with the mass flow m acquired in the previous step, the capacity evaluation module 320 calculates the actual cooling capacity Cap. Of course, for systems with injectors, the resulting Cap has to be multiplied by the ratio of mass entrainments of the injectors. The ratio of mass entrainments of the injectors can be estimated from an injector high pressure in the system, and refrigerant temperatures and pressures at the air inlet and the outlet. Furthermore, the load evaluation and prediction module 330 of the controller automatically learns the heat exchange load characteristic curve from the calculated actual output capacity and the temperature change rate acquired at the refrigeration unit such as a freezer at this point. According to the FIGURE, the desired cooling load "Demand Cap" should be greater than the actual cooling capacity at this point, which means that the actual cooling capacity of the current system is not enough to meet the set demand, and the output of the cooling capacity needs to be further increased. After acquiring the aforementioned evaluation results, the coordination control module 340 of the controller performs coordinated control of the respective compressors and/or injectors. In the process in which the load is changed from small to large, the smaller-sized No. 1 injector (shown in solid line in the FIGURE) is opened first until it is tuned to the maximum opening degree. If the current load demand still cannot be met, the larger-sized No. 2 injector (shown in dashed line in the FIGURE) is opened and the No. 1 injector is temporarily closed. If the No. 2 injector is still slowly adjusted from 0 opening degree while the No. 1 injector is closed, the load of the system will suddenly drop from the load at the full opening degree of the No. 1 injector to the load at the initial small opening degree of the No. 2 injector, and a large shock may be caused. In this example, since the rated flow rate of the No. 1 injector is half that of the No. 2 injector, based on the foregoing considerations, the No. 2 injector is opened from the half opening degree. As the load continues to increase, the opening degree of the No. 2 injector continues to increase until it is opened to the maximum opening degree, and if the current load demand still cannot be met, then at the same time of keeping the maximum opening degree of No. 2 injector, No. 1 injector is opened again and its opening degree is gradually increased until the maximum adjustable range of the injectors of the system is reached. Similarly, the compressor operating strategies of the system can also be adjusted individually or simultaneously. First, the variable frequency compressor (shown in solid line in the FIGURE) in the system is turned on first until it is tuned to the maximum speed and the current cooling capacity output still cannot be met. Therefore, it is necessary to further turn on a fixed frequency compressor (shown in a broken line) whose output power is approximately equal to the maximum output power of the variable frequency compressor, and correspondingly, the output of the variable frequency compressor begins to be adjusted again until the maximum adjustable range of the compressors of the system is reached. Thus, the whole process of the response of the system to the deviation between the desired output and the actual output is realized.

The controllers described above for performing the aforementioned method may involve several functional entities that do not necessarily have to correspond to physically or logically independent entities. These functional entities may also be implemented in software, or implemented in one or more hardware modules or integrated circuits, or implemented in different processing devices and/or microcontroller devices.

In the description, examples are used to disclose the present application, including the best mode, with the purpose of enabling any person skilled in the art to practice the application, including making and using any device or system and performing any of the methods covered. The scope of protection of the present application is defined by the claims, and may include other examples that can be conceived by those skilled in the art. If such other examples have structural elements that do not differ from the literal language of the claims, or if they include equivalent structural elements that do not substantively differ from the literal language of the claims, these examples are also intended to be included in the scope of the claims.

What is claimed is:

1. A control method for an air conditioning system, the air conditioning system comprising one or more compressors and/or one or more injectors, and the control method comprising:
    S100, acquiring an actual cooling/heating capacity output by the air conditioning system, and acquiring an actual temperature change rate of an indoor heat exchange unit;
    S200, automatically learning a heat exchange load characteristic curve of the indoor heat exchange unit based on the actual cooling/heating capacity and the temperature change rate;
    S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and
    S400, adjusting the number of operating compressors and rotational speeds of compressors, and/or adjusting the number of operating injectors and opening degrees of injectors, based on the steady state load and/or the desired load.

2. The control method according to claim 1, wherein the desired temperature change rate is acquired based on an actual temperature of the indoor heat exchange unit, a desired temperature set by a customer, and a desired adjustment time set by the customer.

3. The control method according to claim 2, wherein a function of the desired temperature change rate is $dT/dt_{destined} = -(1/t_0)*Error$; where $dT/dt_{desired}$ is the desired temperature change rate, $t_0$ is the desired adjustment time, and Error is a difference between the actual temperature and the desired temperature.

4. A control method for an air conditioning system, the air conditioning system comprising one or more compressors and/or one or more injectors, and the control method comprising:
    S100, acquiring an actual cooling/heating capacity output by the air conditioning system, and acquiring an actual temperature change rate of an indoor heat exchange unit;
    S200, automatically learning a heat exchange load characteristic curve of the indoor heat exchange unit based on the actual cooling/heating capacity and the temperature change rate;
    S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and
    S400, adjusting the number of operating compressors and rotational speeds of compressors, and/or adjusting the number of operating injectors and opening degrees of injectors, based on the steady state load and/or the desired load;
    wherein a function of the heat exchange load characteristic curve is $dT/dt = k_1*(Load-Cap)$; where $dT/dt$ is the actual temperature change rate, Cap is the actual cooling/heating capacity, $k_1$ is a slope of fitted heat exchange load characteristic curve, and Load is fitted steady state load.

5. A control method for an air conditioning system, the air conditioning system comprising one or more compressors and/or one or more injectors, and the control method comprising:
    S100, acquiring an actual cooling/heating capacity output by the air conditioning system, and acquiring an actual temperature change rate of an indoor heat exchange unit;
    S200, automatically learning a heat exchange load characteristic curve of the indoor heat exchange unit based on the actual cooling/heating capacity and the temperature change rate;
    S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and
    S400, adjusting the number of operating compressors and rotational speeds of compressors, and/or adjusting the number of operating injectors and opening degrees of injectors, based on the steady state load and/or the desired load;
    wherein the actual cooling/heating capacity output by the air conditioning system is acquired based at least on an actual flow rate output by the compressor, a temperature and/or pressure of a refrigerant delivered to the indoor heat exchange unit, and a temperature and/or pressure of the refrigerant returned from the indoor heat exchange unit.

6. The control method according to claim 5, wherein in an air conditioning system having injectors, the actual cooling/heating capacity output by the air conditioning system is also correlated to a ratio of mass entrainments of the injectors.

7. The control method according to claim 5, wherein the actual flow rate output by the compressor is acquired based on a rotational speed of the compressor, inlet pressure and/or inlet temperature, and outlet pressure and/or outlet temperature; or the actual flow rate output by the compressor is acquired based on a flow meter; or the actual flow rate output by the compressor is acquired based on opening degrees of throttling elements at individual indoor heat exchange units and differences between their upstream and downstream pressures.

8. A control method for an air conditioning system, the air conditioning system comprising one or more compressors and/or one or more injectors, and the control method comprising:
S100, acquiring an actual cooling/heating capacity output by the air conditioning system, and acquiring an actual temperature change rate of an indoor heat exchange unit;
S200, automatically learning a heat exchange load characteristic curve of the indoor heat exchange unit based on the actual cooling/heating capacity and the temperature change rate;
S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and
S400, adjusting the number of operating compressors and rotational speeds of compressors, and/or adjusting the number of operating injectors and opening degrees of injectors, based on the steady state load and/or the desired load;
wherein the number of operating compressors is adjusted to the minimum when the steady state load and/or the desired load are satisfied.

9. A control method for an air conditioning system, the air conditioning system comprising one or more compressors and/or one or more injectors, and the control method comprising:
S100, acquiring an actual cooling/heating capacity output by the air conditioning system, and acquiring an actual temperature change rate of an indoor heat exchange unit;
S200, automatically learning a heat exchange load characteristic curve of the indoor heat exchange unit based on the actual cooling/heating capacity and the temperature change rate;
S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and
S400, adjusting the number of operating compressors and rotational speeds of compressors, and/or adjusting the number of operating injectors and opening degrees of injectors, based on the steady state load and/or the desired load;
wherein when all of the compressors are variable frequency compressors, the rotational speeds of all operating compressors are adjusted to be the same if the steady state load and/or the desired load are satisfied.

10. A control method for an air conditioning system, the air conditioning system comprising one or more compressors and/or one or more injectors, and the control method comprising:
S100, acquiring an actual cooling/heating capacity output by the air conditioning system, and acquiring an actual temperature change rate of an indoor heat exchange unit;
S200, automatically learning a heat exchange load characteristic curve of the indoor heat exchange unit based on the actual cooling/heating capacity and the temperature change rate;
S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and
S400, adjusting the number of operating compressors and rotational speeds of compressors, and/or adjusting the number of operating injectors and opening degrees of injectors, based on the steady state load and/or the desired load;
wherein when all of the compressors are fixed frequency compressors, the steady state load and/or the desired load are satisfied by automatically turning on/turning off a minimum number of operating fixed frequency compressors.

11. A control method for an air conditioning system, the air conditioning system comprising one or more compressors and/or one or more injectors, and the control method comprising:
S100, acquiring an actual cooling/heating capacity output by the air conditioning system, and acquiring an actual temperature change rate of an indoor heat exchange unit;
S200, automatically learning a heat exchange load characteristic curve of the indoor heat exchange unit based on the actual cooling/heating capacity and the temperature change rate;
S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and
S400, adjusting the number of operating compressors and rotational speeds of compressors, and/or adjusting the number of operating injectors and opening degrees of injectors, based on the steady state load and/or the desired load;

wherein the number of operating injectors is adjusted to the minimum when the steady state load and/or the desired load are satisfied.

12. A control method for an air conditioning system, the air conditioning system comprising one or more compressors and/or one or more injectors, and the control method comprising:

S100, acquiring an actual cooling/heating capacity output by the air conditioning system, and acquiring an actual temperature change rate of an indoor heat exchange unit;

S200, automatically learning a heat exchange load characteristic curve of the indoor heat exchange unit based on the actual cooling/heating capacity and the temperature change rate;

S300, acquiring a steady state load and/or a desired load of the indoor heat exchange unit based on the heat exchange load characteristic curve, wherein the steady state load is the actual cooling/heating capacity corresponding to the point where the temperature change rate on the heat exchange load characteristic curve is 0, and the desired load is the actual cooling/heating capacity corresponding to the point where the temperature change rate on the heat exchange load characteristic curve is a desired temperature change rate; and S400, adjusting the number of operating compressors and rotational speeds of compressors, and/or adjusting the number of operating injectors and opening degrees of injectors, based on the steady state load and/or the desired load;

wherein the method of acquiring the heat exchange load characteristic curve through automatically learning as described in S200 comprises one or more of function fitting, constructing an artificial neural network and constructing a support vector machine model.

* * * * *